United States Patent [19]

Rhodes

[11] Patent Number: 5,301,584
[45] Date of Patent: Apr. 12, 1994

[54] ZERO CLEARANCE HIGH SPEED WELDED SEAM TUBE CUT-OFF DIE

[75] Inventor: Wayne A. Rhodes, Luray, Tenn.

[73] Assignee: Touchstone, Inc., Jackson, Tenn.

[21] Appl. No.: 31,612

[22] Filed: Mar. 15, 1993

[51] Int. Cl.$^5$ .................... B23D 21/00; B26D 1/60
[52] U.S. Cl. ........................... 83/382; 83/168;
  83/320; 83/383; 83/386; 83/456
[58] Field of Search ............... 83/318, 319, 320, 382,
  83/385, 386, 454, 456, 54, 168, 383; 269/163,
  229, 224

[56] References Cited

U.S. PATENT DOCUMENTS

| | | | |
|---|---|---|---|
| 2,205,389 | 6/1940 | Borzym . | |
| 2,361,595 | 10/1944 | Broersma . | |
| 3,129,624 | 4/1964 | Auer | 83/300 |
| 3,204,504 | 9/1965 | Bradlee | 83/382 X |
| 3,924,502 | 12/1975 | Borzym | 83/454 |
| 3,938,415 | 2/1976 | Borzym | 83/385 |
| 4,595,135 | 6/1986 | Wallis | 228/17 |
| 4,643,063 | 2/1987 | Gobien | 83/311 |
| 4,848,723 | 6/1989 | Borzym | 83/382 X |
| 4,932,297 | 6/1990 | Borzym et al. | 83/319 |
| 4,951,538 | 8/1990 | Borzym | 83/388 |
| 5,063,801 | 11/1991 | Wallis | 83/320 X |
| 5,191,822 | 3/1993 | Borzym | 83/319 X |

Primary Examiner—Eugenia Jones
Attorney, Agent, or Firm—Head & Johnson

[57] ABSTRACT

The present invention is a pair of split dies comprises of a pair of fixed die halves, with each fixed die half having an associating movable die insert. The pair of split dies are separated from each other in order to admit a cutting blade therebetween and a variable width opening is formed between each of the fixed die halves and their associating movable die inserts. The movable die inserts move toward the fixed die halves and thereby decrease the width of the openings in response to cam means attaching to the blade which engage movable cam tracks located on the movable die inserts opposite the openings. The openings close on tubing located within the openings so that the tubing is held stationary on either side of where the blade cuts the tubing. The movable die inserts move away from the fixed die halves and thereby increase the width of the openings in response to disengagement with the cam means. When the cam means are disengaged from the movable die inserts, die springs located in spring pockets provided in the fixed die halves push the movable die inserts away from the fixed die halves, thus releasing the tubing and allowing it to move quickly through the openings as the dies are repositioned on the tubing for the purpose of making another cut.

6 Claims, 3 Drawing Sheets

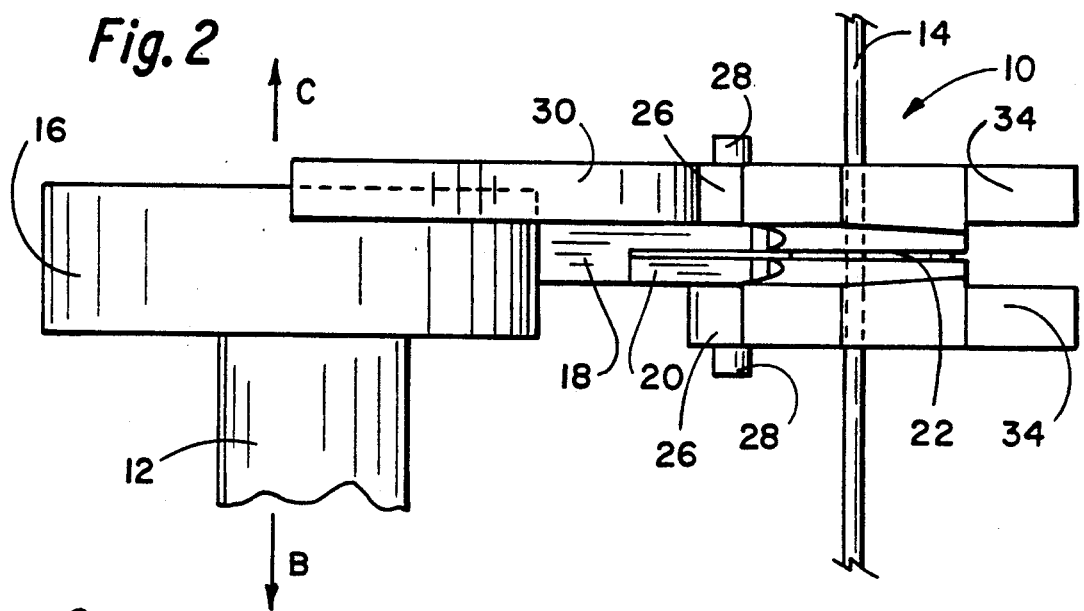
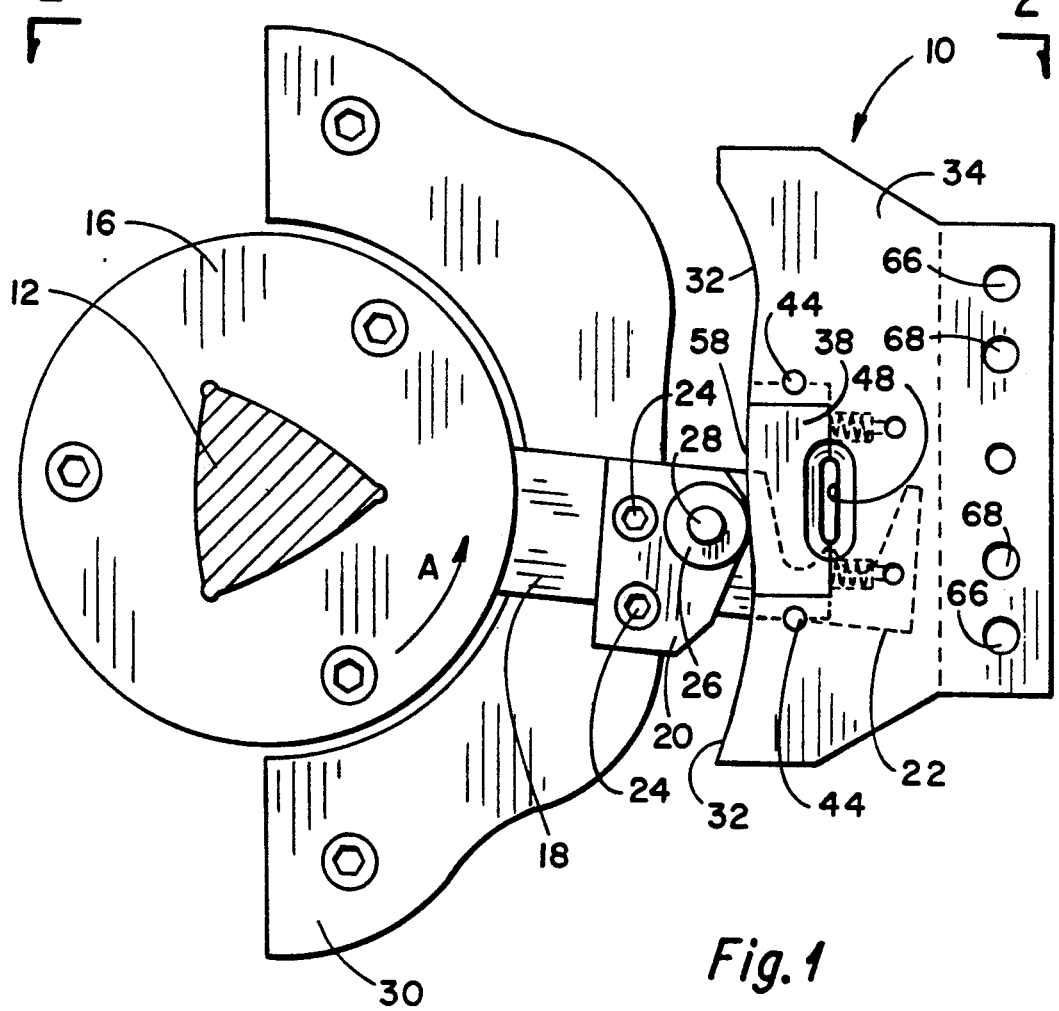

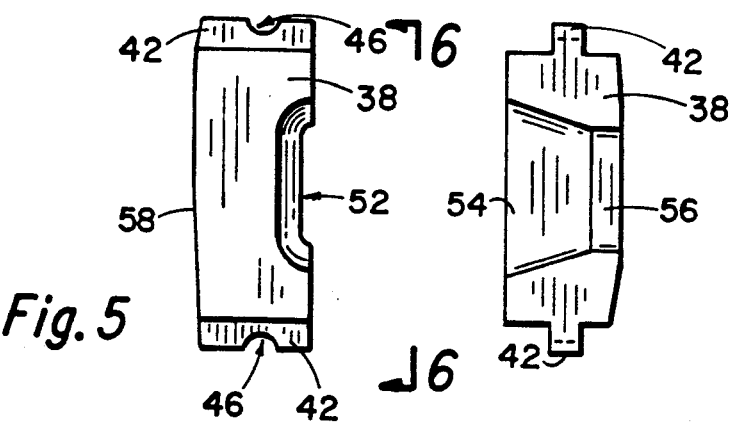
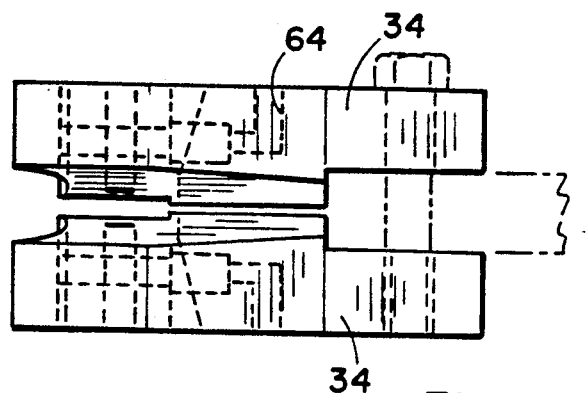
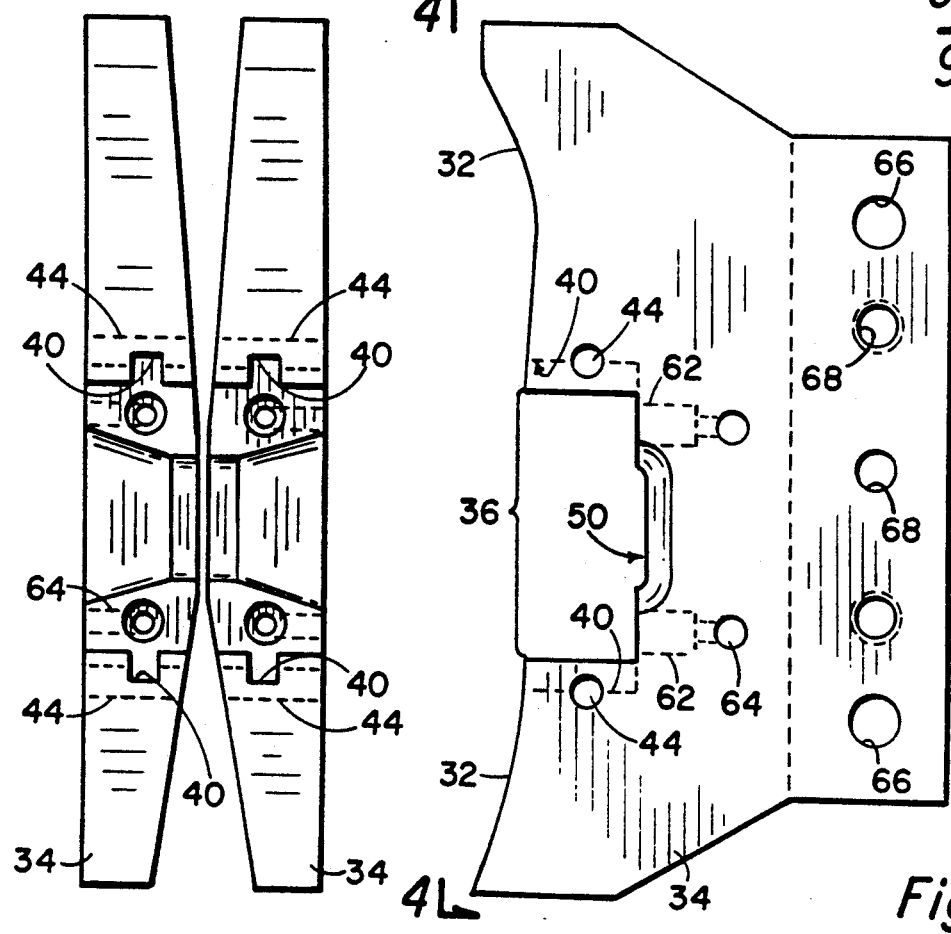

ZERO CLEARANCE HIGH SPEED WELDED SEAM TUBE CUT-OFF DIE

BACKGROUND OF THE INVENTION

1. Field of the Invention

The present invention is a cut-off die comprised of a pair of fixed die halves separated from each other, with each fixed die half having an associating movable die insert so that openings of variable width are formed between stationary halves provided on the fixed die halves and movable halves provided on their associating movable die inserts. The widths of the openings are decreased in response to cam means provided on a cut-off blade assembly pushing against the movable die inserts. When the openings are decreased in widths, the stationary and movable halves of the openings grip the tubing on either side of where the blade cuts the tubing, enabling the tubing to be cut without deformation. Once the cut is completed, the cam means disengage the movable die inserts and die springs provided in pockets on the fixed die halves cause the openings to widen by pushing the movable die inserts away from the fixed die halves.

2. Prior Art

Small diameter welded seam tubing, such as that used in constructing radiators, must be cut to precise lengths. To reduce construction costs, a cutting mechanism must be able to cut the tubing quickly to the correct length without deforming the cut surfaces. Normally, the cutting mechanism travels along a moving strand of tubing stock while the tubing is being cut. Once finished cutting, the cutting mechanism quickly reverses direction of travel, moving backward the proper distance to engage the strand of tubing stock for another cutting cycle. Normally, a pair of cutting mechanisms work together to cut the tubing into tubes of a particular length, with one cutting mechanism cutting a first end of a tube and the other simultaneously cutting a second opposite end of the tube. Synchronization of these movements and the distance between the pair of cutting mechanisms is normally computer controlled to create tubes of the desired lengths.

Currently in the cutting process, tubing is inserted through openings in a pair of solid cut-off dies of the cutting mechanism and a blade moves between the dies to cut the tubing. One problem with using solid cut-off dies is that there must be a certain amount of clearance between the exterior tubing wall and the die openings in order for the tubing to move easily at high speed through the openings without binding. When the blade cuts the tubing, the clearance existing between the exterior tube wall and the die openings allows the tubing to move thus creating deformed, pear-shaped ends on the tubes rather than the desired flat, oval-shaped ends. Deformation of the ends of the tubes during the cut-off stroke renders the ends of the tubes unsuitable for use without further processing, which means that the tubes have to be increased in cut-off length at the tube mill to allow for further processing. The material needed for such an increased tube length and the additional processing required to correct the shape and size of the tube's cut ends adds to the cost of construction. Current die designs have no provision for adjusting the clearance between the dies and the tubing during the cut-off stroke, without sacrificing good high speed running clearance.

The present invention addresses this problem by replacing the solid cut-off dies with a pair of split dies that have movable die inserts. The movable die inserts, in conjunction with the fixed die halves, form split openings through which the tubing extends. The movable die inserts are capable of moving toward their associating fixed die halves to close on the tubing during the cut-off cycle in order to prevent the thin walled tubing from deforming as the cut-off blade enters the tubing and capable of then moving away from their associating fixed die halves to open to full clearance after cutting the tube. The movable die inserts are moved toward the fixed die halves during the cut-off cycle by engagement of cam tracks provided on the movable die inserts by cam rollers that are attached to a continuously rotating, spring loaded blade support arm. Once the cut-off cycle is complete, i.e. the blade support arm has rotated sufficiently for the attached blade to have passed through the tubing and for the cam rollers to have disengaged the movable die inserts, springs provided in the fixed die halves force the movable die inserts away from the fixed die halves, thus widening the openings to their full clearance positions through which the tubing may move easily at high speed.

SUMMARY OF THE INVENTION

The present invention is a cut-off die comprised of a pair of fixed die halves that are separated from each other in order to admit a cut-off blade between them. Each fixed die half is provided with a recess having upper and lower slideways into which insert slides provided on upper and lower edges of movable die inserts. Die insert travel limit pins provided on the fixed die halves extend into the slideways and engage notches provided on the slides as a means of limiting the horizontal movement of the movable die inserts. Vertically split openings are formed by and between stationary halves provided on the fixed die halves and movable halves provided on the movable die inserts. The openings are decreased in width by cam means pushing against cam tracks provided opposite the movable halves on the movable die inserts, causing the movable halves to move toward the stationary halves. The stationary and movable halves of the openings grip tubing located within the openings in order that the tubing can be cut by the blade without deformation. After the tubing is cut, the cam means disengage the cam tracks of the movable die inserts. After the cam means disengaged the cam tracks, die springs provided in spring pockets located in the fixed die halves push against the movable die inserts, causing the openings to widen as the movable halves move away from the stationary halves. As the openings widen, the stationary and movable halves release their grip on the tubing so that the tubing can move at high speed through the openings as the cut-off die is repositioned for another cutting cycle.

BRIEF DESCRIPTION OF THE DRAWINGS

FIG. 1 is a front elevation of a zero clearance high speed welded seam tube cut-off die constructed according to a preferred embodiment of the present invention.

FIG. 2 is a top plan view taken along line 2—2 of FIG. 1.

FIG. 3 is an enlarged front elevation showing the pair of fixed die halves.

FIG. 4 is a left side view taken along line 4—4 of FIG. 3.

FIG. 5 is an enlarged front elevation showing a movable die insert.

FIG. 6 is a right side view taken along line 6—6 of FIG. 5.

FIG. 9 is a top plan view taken along line 9—9 of FIG. 3.

DETAILED DESCRIPTION OF THE PREFERRED EMBODIMENTS

Figure 8:
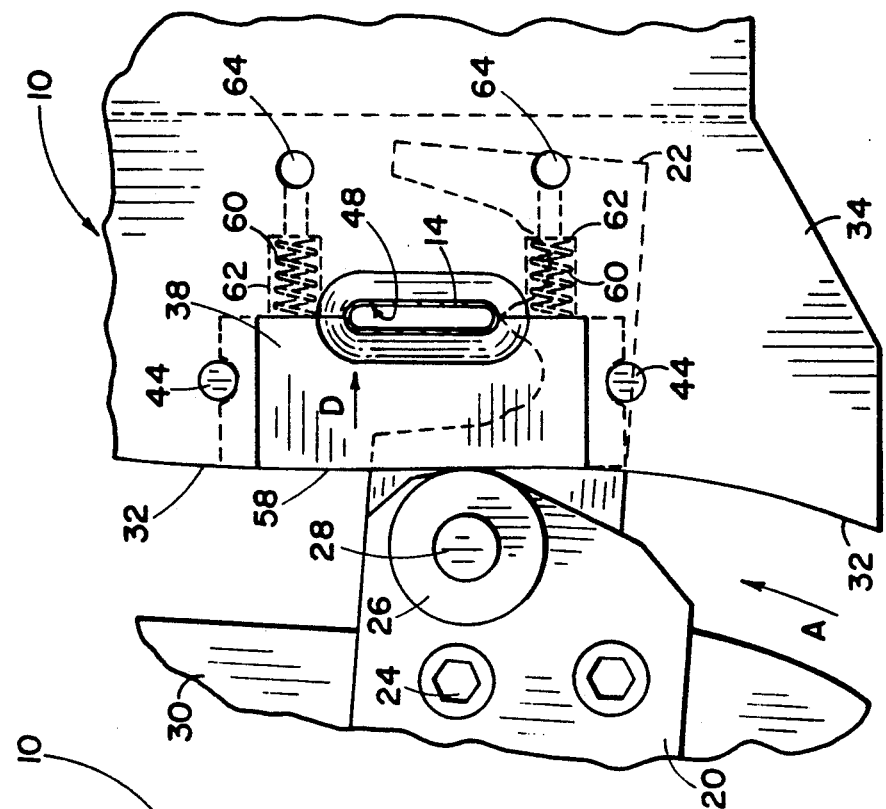
FIG. 8 is a front elevation similar to FIG. 7 showing the cam rollers engaging the movable die inserts as the blade starts to enter the tubing.

Referring now to FIGS. 1 and 2, there is illustrated a zero clearance high speed welded seam tube cut-off die, generally designated by reference numeral 10, constructed according to a preferred embodiment of the present invention. Although not illustrated, the cut-off die 10 attaches to a linear bearing support (not shown) mounted on a drive shaft 12, and the drive shaft 12 extends parallel to a moving strand of welded seam tubing 14. A blade drive 16 provided on the drive shaft 12 continuously rotates in a counterclockwise direction, as shown by arrow "A" of FIGS. 1 and 8, and is movable longitudinally along the drive shaft 12 as shown by arrows "B" and "C" in FIG. 2. Rotation and longitudinal movement of the blade drive 16 is synchronized with movement of the tubing 14 in order to cut the tubing 14 into proper length of tubes (not shown). The linear bearing support (not shown) moves longitudinally as a unit with the blade drive 16 but does not rotate with it.

A spring loaded blade support arm 18 attaches to and extends perpendicularly outward from the blade drive 16. The blade support 18 arm continuously rotates with the blade drive 16. A blade clamp 20 secures a cut-off blade 22 to the blade support arm 18 by means of bolts 24 or other suitable means. The blade clamp 20 is provided with a pair of cam rollers 26 rotatably mounted on a spindle 28 that extends through the blade clamp 20 so that a cam roller 26 attaches on either side of the blade clamp 20.

As the blade support arm 18 rotates, one of the cam rollers 26 continuously engages a non-rotating cam track member 30 provided on the linear bearing support (not shown). As the blade support arm 18 continues to rotate, the cam rollers 26 also engage cam tracks 32 provided on non-rotating fixed die halves 34 of the cut-off die 10.

Referring now to FIGS. 3 and 4, details of the fixed die halves 34 are illustrated. The fixed die halves 34 are spaced apart from each other, as best seen in FIG. 4, in order that the blade 22 can pass between them as the blade 22 rotates. Each of the fixed die halves 34 is provided with a recess 36 for admitting a movable die insert 38. Upper and lower sides of the recess 36 are provided with slideways 40 into which slides 42 provided on upper and lower edges of the movable die insert 38 are movably inserted as the movable die inserts 38 are slid horizontally into the recesses 36.

Once the movable die inserts 38 are in the recesses 36, die insert travel limit pins 44 extending from the fixed die halves 34 into the slideways 40 movably engage notches 46 provided on the slides 42 so that the movable die inserts 38 have limited horizontal movement, generally movement of about 0.010 inch.

The fixed die halves 34 and the movable die inserts 38 together define openings 48 through which tubing 14 extends. The openings 48 are split in half vertically, with a stationary half 50 of each opening 48 being formed by the fixed die half 34 and an opposite movable half 52 of each opening 48 being formed by the movable die insert 38. As illustrated in FIGS. 5 and 6, for one movable die insert 38, each of the movable halves 52 is comprised of a sloped area 54 and a gripping area 56. Although not illustrated, each of the stationary halves 50 is similarly provided with a sloped area 54 and a gripping area 56. The gripping areas 56 of the pair of fixed die halves 34 and the gripping areas 56 of their associating movable die inserts 38 lie adjacent each other with the sloped ares 54 facing outward away from the cut-off die 10. The gripping areas 56 are provided to engage the tubing 14 as it is being cut by gripping the tubing 14 on either side of where the blade 22 will cut and the sloped areas 54 are provided to smoothly guide the tubing 14 through the openings 48 when the tubing is not being cut.

Figure 7:
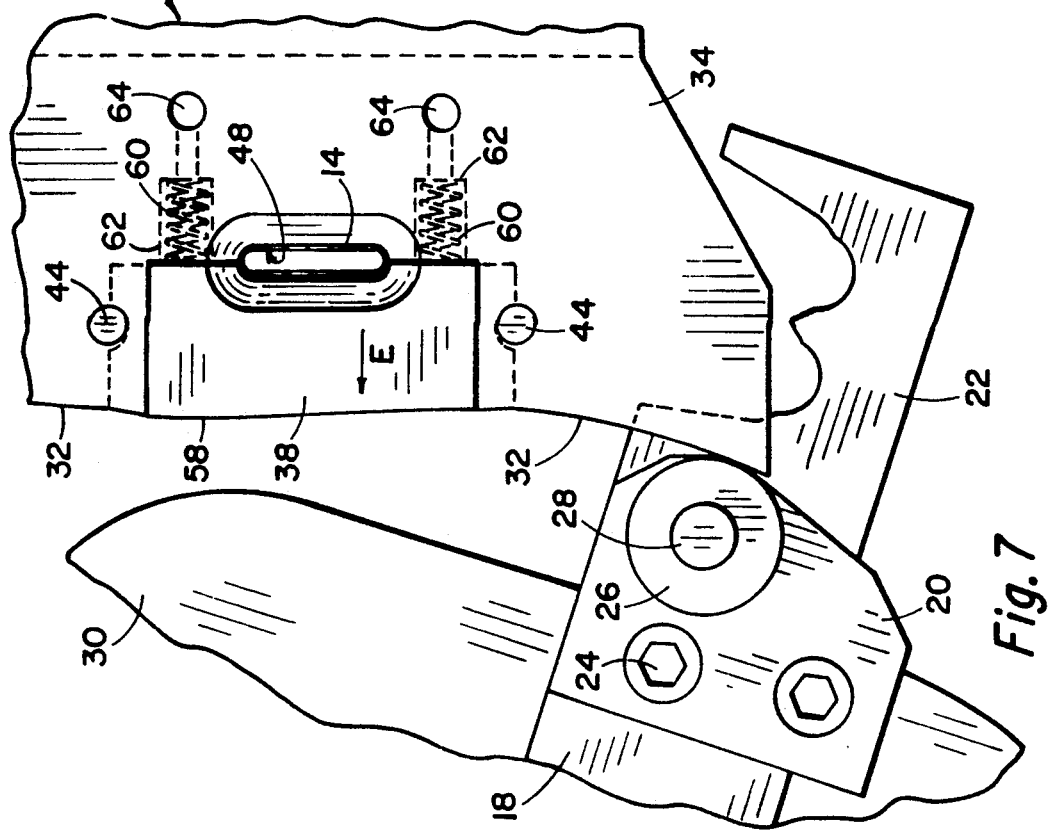
FIG. 7 is a front elevation similar to FIG. 1 showing the cam rollers engaging the cam track on the fixed die halves as the blade begins the cut-off cycle of its rotation.

Movement of the movable die inserts 38 toward the fixed die halves 34, as shown by arrow "D" in FIG. 8, causes the movable halves 52 of the openings 48 to move toward the stationary halves 50, thus slightly narrowing the openings 48 and causing the gripping areas 56 to tightly grip the tubing 14 located within the openings 48. Likewise, movement of the movable die inserts 38 away from the fixed die halves 34, as shown by arrow "E" in FIG. 7, causes the openings 48 to widen and the tubing 14 to be released, thus facilitating high speed travel of the tubing 14 through the openings 48.

Movement of the movable die inserts 38 is initiated by the cam rollers 26 that move with the rotating blade support arm 18. As the cam rollers 26 rotate, they first engage the cam tracks 32 on the fixed die halves 34, as has previously been described. As the cam rollers 26 continue to rotate, they engage movable cam tracks 58 provided on the movable die inserts 38 opposite the movable halves 52, causing the movable die inserts 38 to move toward the fixed die halves 34, thus closing the openings 48 on the tubing 14 in preparation for cutting the tubing 14. After the tubing 14 is cut, the cam rollers 26 continue to rotate until they disengage the movable cam tracks 58. The movable die inserts 38 are then pushed away from the fixed die halves 34 by means of die springs 60 mounted in spring pockets 62 provided in the fixed die halves 34, thus widening the openings 48 and releasing the tubing 14 to move freely through the openings 48.

Each of the spring pockets 62 is provided with an access port 64 through which air, water, oil, or other suitable cleaning medium can be introduced via the spring pocket 62 to clean and/or lubricate surfaces of the movable die inserts 38 and the fixed die halves 34. The cleaning medium serves to clear away metal shavings (not shown) or other similar debris from where the movable die inserts 38 interface with the fixed die halves 34.

The fixed die halves 34 are provided with bolt holes 66 and dowel holes 68 as means respectively for securing the fixed die halves 34 to the linear bearing support (not shown) and for aligning the cut-off die 10.

Whereas the present invention has been disclosed in terms of the specific structure described above, it should be understood that other and further modifications, apart from those shown or suggested herein, may be made within the spirit and scope of this invention and that the invention is limited only by the claims contained herein.

What is claimed is:

1. A cut-off die for use in conjunction with a continuously rotating cut-off blade mechanism for the purpose of closing on tubing while the cut-off blade mechanism is cutting the tubing and for opening to full clearance after cutting to release the tubing and to allow the tubing to move through the die without binding, comprising:

a pair of fixed die halves being spaced apart to admit passage of the rotating cut-off blade mechanism therebetween;
   means for attaching the fixed die halves so the fixed die halves move in alignment with the cut-off blade mechanism;
   each of the fixed die halves being provided with a recess having slideways;
   movable die inserts having slides, said slides engaging said slideways when said movable die inserts are inserted into said recesses;
   an opening being formed between each of the fixed die halves and their associating movable die inserts in order to admit the tubing through the openings, a stationary half of each opening being provided on the fixed die halves and a movable half of each opening being provided on the movable die inserts;
   means for moving the movable die inserts toward the fixed die halves in order to close the stationary and movable halves on the tubing;
   means for moving the movable die inserts away from the fixed die halves in order to release the tubing to freely move through the openings; and
   die insert travel limit pins provided on each of said fixed die halves and extending into said slideways, said die insert travel limit pins engaging notches provided on said slides so as to limit the movement of said movable die inserts within said recesses.

2. A cut-off die according to claim 1 wherein die springs located in spring pockets provided in the fixed die halves engage the movable die inserts as the means for moving the movable die inserts away from the fixed die halves.

3. A cut-off die according to claim 2 further comprising:

access ports being provided in the fixed die halves, the access ports communicating with the spring pockets in order to admit cleaning medium between the fixed die halves and the movable die inserts.

4. A cut-off die according to claim 1 further comprising:

each of the stationary halves and each of the movable halves of the opening being provided with a gripping area and a sloped area so that the sloped areas face outward from the cut-off die and the gripping areas are adjacent each other.

5. A cut-off die according to claim 1 wherein the means for moving the movable die inserts toward the fixed die halves comprises:

cam tracks being provided opposite the movable halves on the movable die inserts, the cam tracks being engageable by cam means provided on the cut-off blade mechanism in order to push the movable die inserts toward the fixed die halves.

6. A cut-off for use in conjunction with a continuously rotating cut-off blade mechanism for the purpose of closing on tubing while the cut-off blade mechanism is cutting the tubing and for opening to full clearance after cutting to release the tubing and to allow the tubing to move through the die without binding, comprising:

a pair of fixed die halves being spaced apart in order to admit passage of the rotating cut-off blade mechanism therebetween;
   means for attaching the fixed die halves so the fixed die halves move in alignment with the cut-off blade mechanism;
   each of the fixed die halves being provided with a recess having slideways;
   movable die inserts having slides, said slides engaging said slideways when said movable die inserts are inserted in said recesses;
   die insert travel limit pins being provided on the fixed die halves and extending into the slideways, said die insert travel limit pins engaging notches provided on the slides so as to limit movement of the movable die inserts within the recesses;
   an opening being formed between each of the fixed die halves and their associating movable die inserts in order to admit the tubing through the openings, a stationary half of each opening being provided on the fixed die halves and a movable half of each opening being provided on the movable die inserts;
   cam tracks being provided opposite the movable halves on the movable die inserts, said cam tracks being engageable by cam means provided on the cut-off blade mechanism in order to push the movable die inserts toward the fixed die halves;
   die springs being located in spring pockets provided in the fixed die halves, said die springs engaging the movable die inserts as a means of moving the movable die inserts away from the fixed die halves;
   access ports being provided in the fixed die halves, the access ports communicating with the spring pockets in order to admit cleaning medium between the fixed die halves and the movable die inserts via the spring pockets; and
   each of the stationary halves and each of the movable halves of the opening being provided with a gripping area and a sloped area so that the sloped areas face outward from the cut-off die and the gripping areas are adjacent each other.

* * * * *